United States Patent
El-Shishiny et al.

(10) Patent No.: US 8,055,498 B2
(45) Date of Patent: Nov. 8, 2011

(54) SYSTEMS AND METHODS FOR BUILDING AN ELECTRONIC DICTIONARY OF MULTI-WORD NAMES AND FOR PERFORMING FUZZY SEARCHES IN THE DICTIONARY

(75) Inventors: Hisham El-Shishiny, Giza (EG); Pavel Volkov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 11/859,996

(22) Filed: Sep. 24, 2007

(65) Prior Publication Data

US 2008/0091413 A1    Apr. 17, 2008

(30) Foreign Application Priority Data

Oct. 13, 2006    (EP) .................................. 06122226

(51) Int. Cl.
*G06F 17/21*    (2006.01)
*G06F 17/30*    (2006.01)
*G06F 7/00*    (2006.01)

(52) U.S. Cl. .............. 704/10; 704/1; 707/780; 707/797; 707/798; 707/808

(58) Field of Classification Search .................. None
See application file for complete search history.

(56) References Cited

U.S. PATENT DOCUMENTS 4,672,571 A    6/1987    Bass et al.
(Continued)

FOREIGN PATENT DOCUMENTS

EP    0179215 A2    4/1986
EP    1197885 A2    4/2002

OTHER PUBLICATIONS

Oerder, M. et al. "Word graphs: an efficient interface between continuous-speech recognition and language understanding," Acoustics, Speech, and Signal Processing, 1993. ICASSP-93., 1993 IEEE International Conference on, pp. 119-122 vol. 2.*

(Continued)

*Primary Examiner* — Matthew Sked
(74) *Attorney, Agent, or Firm* — Andrea Bauer; Hoffman Warnick LLC

(57) ABSTRACT

The present invention automatically builds a contracted dictionary from a given list of multi-word proper names and performs fuzzy searches in the contracted dictionary. The contracted dictionary of proper names includes two linked trie-based dictionaries: a first dictionary is used to store single word names, each word name having an ID number; and a second dictionary is used to store multi-word names encoded with ID numbers. Information related to the multi-word names is also stored as a gloss to the terminal node of the multi-word entry of the trie-based dictionary. An approximate lookup for a multi-word name is conducted first for each word of the multi-word name using an approximate matching technique such as a phonetic proximity or a simple edit distance. Accordingly, N suggestions is determined for each word of the multi-word name under consideration. Then, multi-word candidates are assembled in ID notation. Finally, an approximate search for each assembled candidate is performed based on an edit distance or a n-grams approximate string matching. Edit distances and N-grams are used to measure how similar two strings are. The result is a set of multi-word suggestions in an ID notation. This ID notation is encoded back to the original form using the first trie-based dictionary.

16 Claims, 5 Drawing Sheets

U.S. PATENT DOCUMENTS

| | | | |
|---|---|---|---|
| 5,893,102 A * | 4/1999 | Maimone et al. | 1/1 |
| 6,298,321 B1 | 10/2001 | Karlov et al. | |
| 6,895,377 B2 * | 5/2005 | Kroeker et al. | 704/257 |
| 6,912,516 B1 * | 6/2005 | Ikeda et al. | 706/45 |
| 7,013,304 B1 | 3/2006 | Schuetze et al. | |
| 7,222,067 B2 * | 5/2007 | Glushnev et al. | 704/10 |
| 7,848,926 B2 * | 12/2010 | Goto et al. | 704/251 |
| 2006/0004744 A1 | 1/2006 | Nevidomski et al. | |
| 2006/0277032 A1 * | 12/2006 | Hernandez-Abrego et al. | 704/9 |
| 2006/0293880 A1 * | 12/2006 | Elshishiny et al. | 704/10 |

OTHER PUBLICATIONS

Morimoto, Katsushi, Iriguchi, Hirokazu, Aoe, Jun-Ichi, "A Dictionary Retrieval Algorithm Using Two Trie Structures," Systems & Computers in Japan; Feb. 1, 1995, vol. 26 Issue 2, p. 85-97, 13p.*

PCT, International Searching Authority, International Search Report and the Written Opinion, International Application No. PCT/EP2007/054293, Date of Mailing Jan. 4, 2008.

* cited by examiner upper south street
lower street

SYSTEMS AND METHODS FOR BUILDING AN ELECTRONIC DICTIONARY OF MULTI-WORD NAMES AND FOR PERFORMING FUZZY SEARCHES IN THE DICTIONARY

FIELD OF THE INVENTION

The present invention relates to the field of electronic dictionaries and more particularly to methods, systems and computer programs for automatically building a contracted dictionary from a given list of multi-word proper names and for performing fuzzy searches in the dictionary.

BACKGROUND OF THE INVENTION

There are many applications where a user needs to search for a proper name, with a limited knowledge about the name, in a database containing, for example, street names in a city or passport holders in a country. A problem may arise if the user has only a vague or uncertain knowledge about the proper spelling of the name the user is looking for (e.g., when the user has only heard the name) or if multiple spelling variants exist for the same name. This problem is worse if the user is looking for a multi-word name (e.g., a full name composed from a first name, middle names and family name) with an inaccurate knowledge about the multi-word name. For instance, the user can confuse the first name and middle names.

Given the current emergence of many solutions deployed on portable devices with limited computing resources, there is also a need for building compact dictionaries of multi-word proper names with a small memory footprint that can be searched efficiently and effectively for names where a vagueness or uncertainty exists.

The problem of vagueness or uncertainty in names is currently dealt with through wildcards to find similar names or through phonetic searches. These methods are applied to only single word names and concentrate on the search for names in documents or texts. Known search methods based on stemming techniques to reduce words to their basic forms are only useful for searching regular words and are not appropriate for searching names.

Existing methods only focusing on approximate searching for single word names in a text have numerous drawbacks including, for example:

they are not concerned with building and searching dictionaries of proper names and more specifically contracted dictionaries of proper names; and
  they mainly focus on approximate searching of single word names and do not provide elaborate solutions for approximate searching of multi-word names U.S. Pat. No. 4,672,571 to Bass et al., entitled "Compound word suitability for spelling verification", discloses a compound word spelling verification technique for use with a dictionary which does not include all verifiable compounds. During verification of a text word, an attempt is made to find a pair of words in the dictionary of which the text word consists. A table associated with the dictionary includes compound class information relative to each of the words stored therein. The compound class of each of the pair of words of which the input text word consists are tested for compatibility to determine if each of the pair of words may acceptably be used in a compound word in the physical position in which it is found in the input text word. U.S. Pat. No. 4,672,571 relates to compound words (which are single words) and does not disclose an approximate search method that looks for multi-word names in a dictionary that are close to a specific selected multi-word name.

SUMMARY OF THE INVENTION

The present invention relates to the field of electronic dictionaries and more particularly to methods, systems and computer programs for automatically building a contracted dictionary from a given list of multi-word proper names and for performing fuzzy searches in the dictionary for proper names for which the user has only a limited knowledge.

An aspect of the present invention provides a method for automatically building a contracted dictionary from a list of multi-word units, comprising: receiving an input list of original multi-word units; transforming the original multi-word units into single word elements; associating an identifier with each single word element to obtain a collection of unique identifiers, each identifier being associated with a single word element; storing the collection of identifiers and associated single word elements in a letter trie-based dictionary wherein: each entry is a single word element; letters of the single word elements are nodes of the trie; and identifiers are glosses attached to the terminal nodes of the trie; encoding each original multi-word unit in the input list by replacing each single word element within each multi-word unit by its associated identifier; storing the encoded multi-word units in an identifier trie-based dictionary wherein each entry is a set of identifiers representing a multi-word unit and each node is an identifier; and building a contracted dictionary by contracting the letter trie-based dictionary and the identifier trie-based dictionary; the contracting comprising, for the letter trie-based dictionary and the identifier trie-based dictionary, merging trie nodes while preserving each entry of the letter trie-based dictionary and each entry of the identifier trie-based dictionary.

Another aspect of the present invention provides a method for performing fuzzy searches in a contracted dictionary of multi-word units, the contracted dictionary comprising two contracted trie-based dictionaries: a letter trie-based dictionary comprising single word elements, each word element having an identifier, each identifier being associated with a single word element, wherein each entry is a single word element, letters of the single word elements are nodes of the trie, and identifiers are glosses attached to the terminal nodes of the trie; and an identifier trie-based dictionary comprising multi-word units encoded with the identifiers wherein each entry is a set of identifiers representing a multi-word unit and each node is an identifier; the method comprising: receiving a request comprising a multi-word unit; transforming the multi-word unit into single word elements; for each single word element, identifying in the letter trie-based dictionary a suggested word element with an identical string of letters and if none exists, applying on the letter trie-based dictionary an approximate matching technique for generating at least one suggested single word element with a letter string as similar as possible to the single word element; for each suggested word element, extracting from the letter trie-based dictionary the suggested single word element encoded with an identifier, each identifier being associated with a single word element; generating at least one multi-word unit candidate encoded with identifiers by assembling identifiers of encoded existing and suggested single word elements; for each encoded multi-word unit candidate, applying on the identifier trie-based dictionary, an approximate matching technique for obtaining at least one suggested multi-word unit encoded with identifiers as similar as possible to the encoded multi-word unit candidate; and for each encoded suggested multi-word unit, replacing each identifier by the associated single word element.

Another aspect of the present invention provides a system for automatically building a contracted dictionary from a given list of multi-word units, comprising: a system for receiving an input list of original multi-word units; a system for transforming the original multi-word units into single word elements; a system for associating an identifier with each single word element to obtain a collection of unique identifiers, each identifier being associated with a single word element; a system for storing the collection of identifiers and associated single word elements in a letter dictionary based on a trie, wherein: each entry is a single words element; letters of the single word elements are nodes of the trie; and identifiers are glosses attached to the terminal nodes of the trie; a system for encoding each original multi-word unit in the input list by replacing each single word element within each multi-word unit by the associated identifier; a system for storing the encoded multi-word units in an identifier trie-based dictionary, wherein each entry is a set of identifiers representing a multi-word unit and each node is an identifier; and a system for building a contracted dictionary by contracting the letter trie-based dictionary and the identifier trie-based dictionary, the system for building a contracted dictionary further comprising, for the letter trie-based dictionary and the identifier trie-based dictionary, a system for merging trie nodes while preserving each entry of the letter trie-based dictionary and each entry of the identifier trie-based dictionary.

Another aspect of the present invention provides a program product stored on a computer readable medium, which when executed, automatically builds a contracted dictionary from a given list of multi-word units, the computer readable medium comprising program code for: receiving an input list of original multi-word units; transforming the original multi-word units into single word elements; associating an identifier with each single word element to obtain a collection of unique identifiers, each identifier being associated with a single word element; storing the collection of identifiers and associated single word elements in a letter dictionary based on a trie, wherein: each entry is a single words element; letters of the single word elements are nodes of the trie; and identifiers are glosses attached to the terminal nodes of the trie; encoding each original multi-word unit in the input list by replacing each single word element within each multi-word unit by the associated identifier; storing the encoded multi-word units in an identifier trie-based dictionary, wherein each entry is a set of identifiers representing a multi-word unit and each node is an identifier; and building a contracted dictionary by contracting the letter trie-based dictionary and the identifier trie-based dictionary; the contracting comprising, for the letter trie-based dictionary and the identifier trie-based dictionary, merging trie nodes while preserving each entry of the letter trie-based dictionary and each entry of the identifier trie-based dictionary.

BRIEF DESCRIPTION OF THE DRAWINGS

These and other features of the present invention will be more readily understood from the following detailed description taken in conjunction with the accompanying drawings.

DETAILED DESCRIPTION OF THE INVENTION

The following description is presented to enable one or ordinary skill in the art to make and use the invention and is provided in the context of a patent application and its requirements. Various modifications to the disclosed embodiment(s) and the generic principles and features described herein will be readily apparent to those skilled in the art. Thus, the present invention is not intended to be limited to the embodiment(s) shown but is to be accorded the widest scope consistent with the principles and features described herein.

The present invention can be used to build a contracted dictionary of proper names comprising two linked trie-based dictionaries (a trie-based dictionary is a dictionary where the entries are represented in the form of a trie). A first dictionary is used to store single word names, each word name having an identification number (ID number). A second dictionary is used to store multi-word names encoded with ID numbers. Information related to the multi-word names (such as gender, occupation, etc., of the name holder) is also stored as a gloss to the terminal node (a terminal node marks a valid dictionary entry in the trie) of the multi-word entry of the trie-based dictionary.

An approximate lookup for a multi-word name is conducted first for each word of a multi-word name using an approximate matching technique such as a phonetic proximity or a simple edit distance. Accordingly, N suggestions are determined for each word of the multi-word name under consideration. Then, multi-word candidates are assembled in ID notation. Finally, an approximate search for each assembled candidate is performed based on an edit distance or an n-grams approximate string matching. Edit distance is the minimum number of simple edit operations (insertion, deletion or substitution of characters) needed to transform one string to another. N-gram proximity is the number of common substrings of certain length between two strings. Edit distances and N-grams are used to measure how similar two strings are.

The result is a set of multi-word suggestions in an ID notation. This ID notation is encoded back to the original form using the first trie-based dictionary.

Figure 1A:
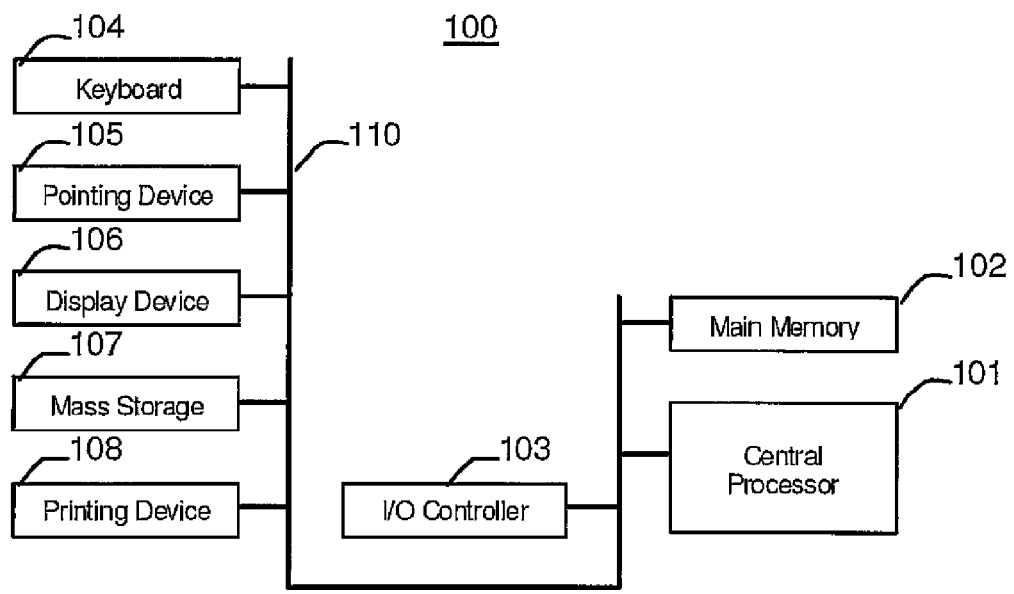
FIG. 1A is a block diagram of an illustrative computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, etc.), a display device 106, and a mass storage 107 (e.g., a hard disk). Additional input/output devices, such as a printing device 108, can be included in the system 100 as desired. As illustrated, the various components of the system 100 communicate through a system bus 110 or similar architecture.

Figure 1B:
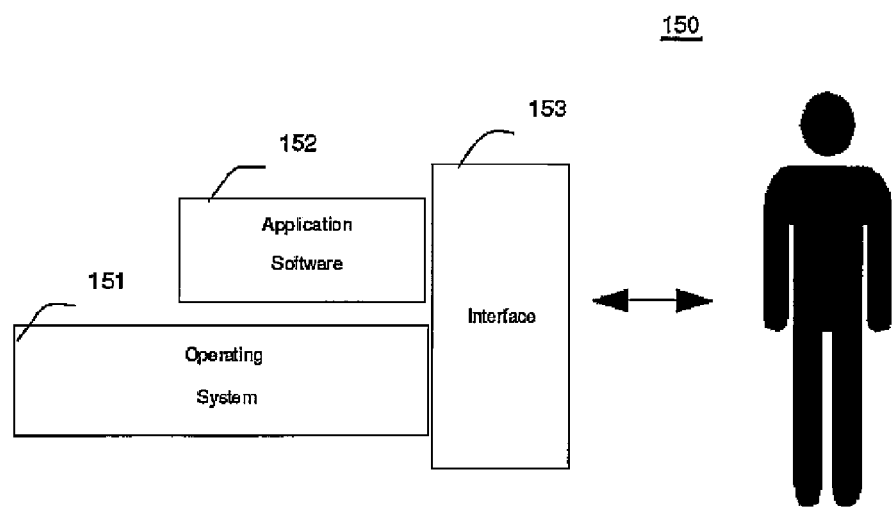
FIG. 1B is a block diagram of an illustrative software system including an operating system, application software, and a user interface for carrying out the present invention.

As illustrated in FIG. 1B, a computer software system 150 is provided for directing the operation of the computer system 100. Software system 150, which can be stored in system memory 102 and on disk memory 107, includes a kernel or operating system 151 and a shell or interface 153. One or more application programs, such as application software 152, may be "loaded" (e.g., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which can comprise a graphical user interface (GUI), also serves to display results, whereupon the user may supply additional inputs or terminate the session.

In computer science, a "trie", or prefix tree, is an ordered tree data structure that is used to store an associative array where the keys are strings. Unlike a binary search tree, no node in the tree stores the key associated with that node. Instead, its position in the tree shows what key it is associated with. All the descendants of any one node have a common prefix of the string associated with that node, and the root is associated with the empty string. Values are normally not associated with every node, only with leaves and some inner nodes that happen to correspond to keys of interest.

The term "trie" comes from "retrieval". Due to this etymology, it is pronounced "tree", although some encourage the use of "try" in order to distinguish it from the more general tree.

Figure 2:
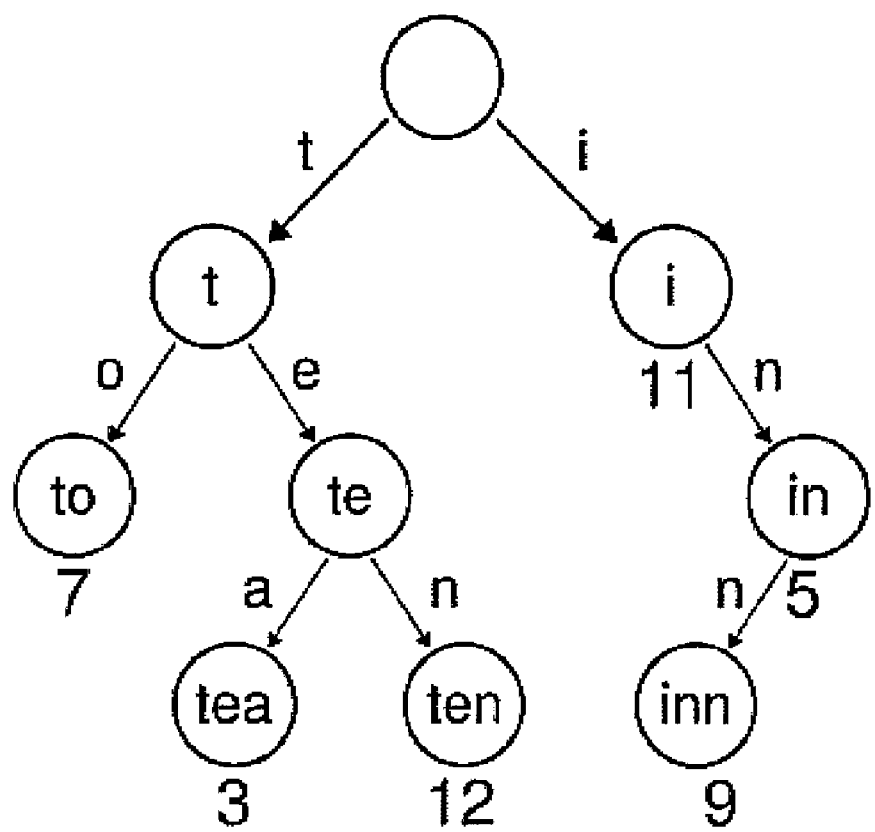
FIG. 2 depicts an example of a "trie".

FIG. 2 shows a trie for keys "to", "tea", "ten", "i", "in", and "inn". In this example, keys are listed in the nodes and values below them. Each complete English word has an integer value associated with it. A trie can be seen as a deterministic finite automaton, although the symbol on each edge is often implicit in the order of the branches. It is not necessary for keys to be explicitly stored in nodes. (In FIG. 2, words are shown only to illustrate how the trie works.) Though it is most common, tries need not be keyed by character strings. The same algorithms can easily be adapted to serve similar functions of ordered lists of any construct, e.g., permutations on a list of digits, permutations on a list of shapes, etc.

An application of a trie is storing a dictionary, such as one found on a mobile telephone. Such applications take advantage of a trie's ability to quickly search for, insert, and delete entries; however, if storing dictionary words is all that is required (i.e., storage of information auxiliary to each word is not required), a minimal acyclic deterministic finite automata would use less space than a trie. Tries are also well suited for implementing approximate matching algorithms, including those used in spell checking software. More information about trie-based dictionaries can be found at the following web page: http://en.wikipedia.org/wiki/Trie.

A method according to an embodiment of the present invention can be divided in two phases: a first phase for building and contracting a trie-based dictionary of names; and a second phase for searching for names in the dictionaries.

Phase 1: Building a contracting trie-based dictionary based on a letter trie-based dictionary and a ID trie-based dictionary of names. Note that the expressions "contracted dictionary", "condensed dictionary" or "compacted dictionary" can be used indifferently.

Figure 3:
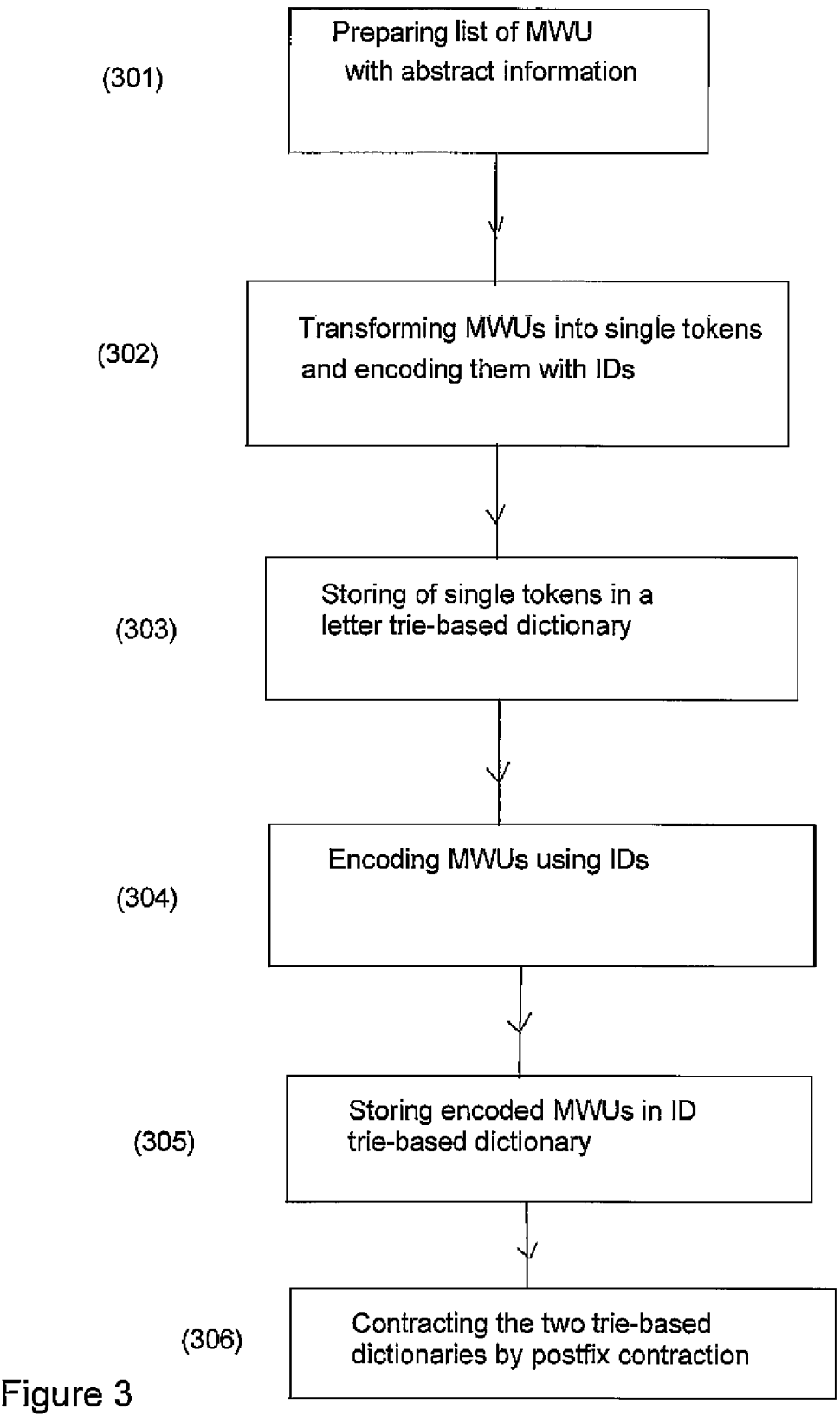
FIG. 3 depicts a flow diagram of an illustrative method for building and contracting a trie-based dictionary of names according to an embodiment of the present invention.

The phase of building and contracting a trie based dictionary of names is depicted in FIG. 3.

In 301, a list of Multi-word Unit (MWU) entries (e.g., street names or people names) is prepared. Abstract information (such as the gender and occupation of the name holder) is attached to each entry. Note: the expressions "Multi-word Units" and "Multi-word Names" will be used indifferently in the present description.

In 302, for each entry of the input list, a "white space tokenizer" (a white space tokenizer is the simplest way to tokenize a text using white spaces as delimiters) transforms the Multi-word Units (MWUs) in single word elements (tokens) for each entry from the input list. Each single word element (token) is encoded using an identifier (ID). After having processed each entry of the input list, a collection of unique identifiers (IDs) is obtained. Each identifier (ID) refers to an original single word element (token). An identifier (ID) can be used to define one or several Multi-word Units (MWUs). The collection does not contain any duplicated identifier (ID).

In 303, the collection of identifiers and associated single word elements obtained in 302 is stored in a letter trie-based dictionary (a letter trie-based dictionary is a dictionary where the entries are words represented in the form of a trie and the nodes of the trie are the letters of the words). The mapping of unique identifiers (IDs) to single word elements is stored using a separate database (an array data structure). For instance, the names "upper south street" and "lower street" are encoded as illustrated in FIG. 5.

Figure 5:
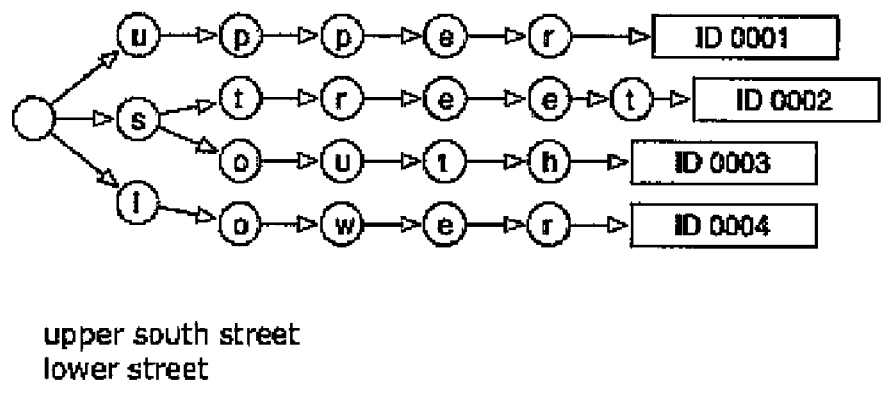
FIG. 5 shows how the names "upper south street" and "lower street" are encoded in a first phase according to an embodiment of the present invention.

FIG. 5 shows a trie comprising 4 key strings. Nodes are drafted as circles. Glosses are drafted as boxes. The empty circle represents the root node. Each path from the root node to gloss contains the key string.

In 304, a new notation is used to define Multi-word Units (MWUs). Original Multi-word Units (MWUs) stored in the input list are encoded using unique identifiers (IDs). Each single word element (token) is replaced within each Multi-word Unit (MWU) by it's own identifier (ID). The same "tokenizer" as defined in 301 is used. For example:
  the name "upper south street" is encoded using the notation 0001 0003 0002; and
  the name "lower street" is encoded using the notation 0004 0002.

In 305, the encoded Multi-word Units (MWUs) are stored in an ID trie-based dictionary. For each entry, the abstract information associated with the MWU is attached to it's terminal node (a terminal node marks a valid dictionary entry in the trie).

In 306, each trie-based dictionary (the trie-based dictionaries obtained in 303 and 305) is postfix contracted. Postfix contraction is performed for each dictionary by merging trie nodes whenever they have identical information gloss with a condition that each entry string (single word element or set of identifiers representing a multi-word unit) stored in the trie is preserved and no new entry string is introduced.

Contracted and uncontracted tries have the same dictionary entries. However, the contracted trie has a less number of nodes then the uncontracted trie and thus is smaller in size. Contraction aims at minimizing the dictionary size by merging trie nodes which can be merged without loosing dictionary entries and without introducing new entries.

Figure 6:
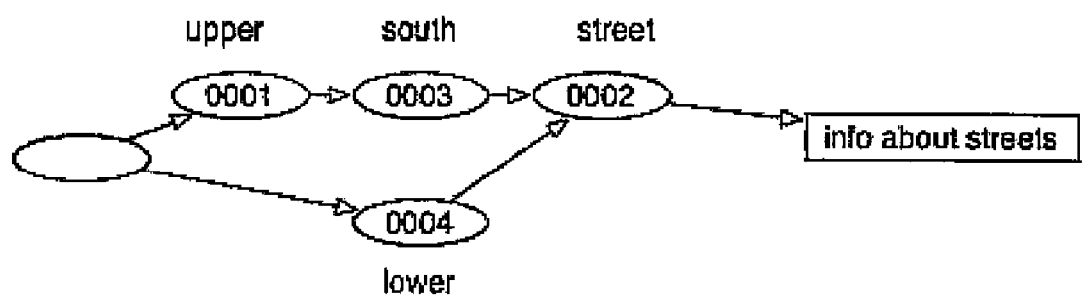
FIG. 6 depicts multi-word units encoded using unique IDs and stored in an ID trie-based dictionary with information related to dictionary entries according to an embodiment of the present invention.

For example, if the names "upper south street" and "lower street" share the same abstract information, then the trie will look like what is shown in FIG. 6. In FIG. 6, an example is given for encoding multi-word units using unique identifiers IDs and for storing them in an ID trie-based dictionary with information related to each entry attached. To this extent:
  the name "upper south street" is now encoded as 0001 0003 0002; and
  the name "lower street" is now encoded as 0004 0002.
0001 0002 0003 0004 are nodes in the trie.

Figure 4:
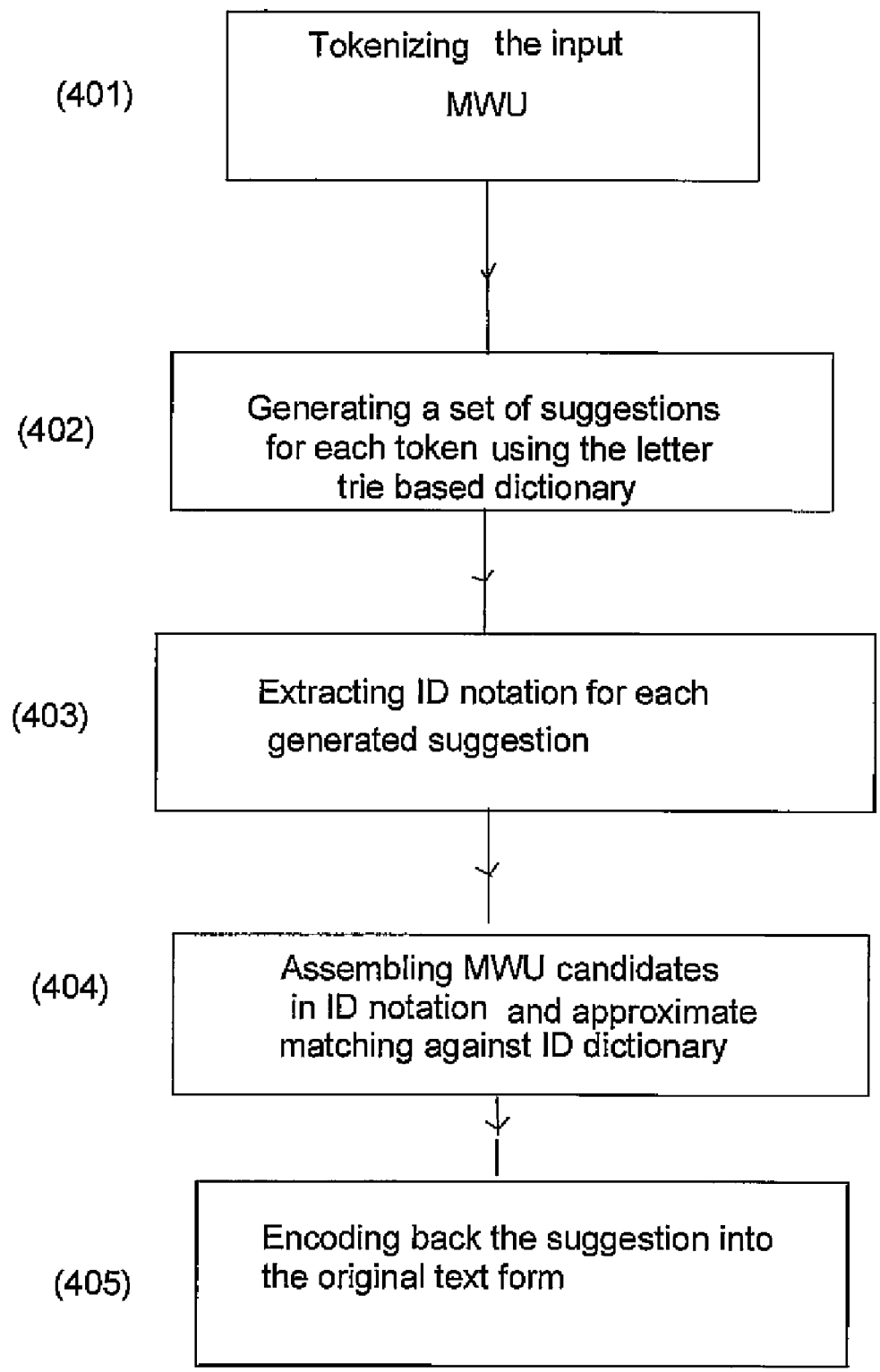
FIG. 4 depicts a flow diagram of an illustrative method for searching for names in trie-based dictionaries according to an embodiment of the present invention.

Phase 2: Searching for names in the dictionary. The input of this second phase, illustrated in FIG. 4, is a Multi-word Unit (MWU) having:

a missing, transposed, or misspelled token "upper street south"; or one or more extra single word elements (tokens).

The problem is to match the closest Multi-word Unit (MWU) in the original input list. The expected result is the following: "upper south street"

In 401, the Multi-word Unit (MWU) in input is "tokenized" (transformed in single word elements or tokens) using the "tokenizer" defined in 301 of first phase.

In 402, for each single word element, a matching technique for finding an identical word element is applied on the letter trie-based dictionary, or if none exists, one or a plurality of suggested word elements with a letter string as similar as possible to the single word element is generated. The result is the following: either the letter trie-based dictionary comprises an entry which exactly matches the single word element and there is one suggested word element which is identical to the single word element or if there is no exact matching, there is one or a plurality of suggested word elements, each suggested word element being close to the single word element.

For each single word element (token), a set of suggestions is generated using the letter trie-based dictionary obtained in step 303 of first phase.

To generate N-number suggestions (a N-number suggestion is a number of suggested words with strings as similar as possible to the word under consideration), any approximate matching technique can be used. An exact match is also allowed, if any.

The approximate matching process uses an arbitrarily proximity factor to reject and rank suggestions. Among the most reasonable proximities, is the phonetic proximity and the simple edit distance (the edit distance between two strings is given by the minimum number of operations needed to transform one string into the other, where an operation is an insertion, deletion, or substitution of a single character). For example, for "uper", the following suggestions can be made: "upper" or "super".

In 403, for each generated suggestion, an ID notation can be extracted using the letter trie-based dictionary obtained in 303 of phase 1 (see FIG. 5). For example, "upper"->ID0001

In 404, one or a plurality of Multi-word Unit candidates encoded with identifiers are generated by assembling identifiers of encoded suggested and existing single word elements. It should be noted that a Multi-word Unit may be composed partially of suggested single word elements and partially of single word elements that already existed in the Multi-word Unit (MWU).

Once the Multi-word Unit (MWU) candidates are assembled in ID notation, an approximate matching against the ID trie-based dictionary built in 305 of the first phase is executed. As a result, a set of suggestions in ID notation is obtained.

For approximate matching on this level, edit distance or n-gram proximity can be used. For example, after correction in 402 we get:

transposed street name in ID notation: 0001 0002 0003 (0001 corresponds to "upper", 0002 corresponds to "street", and 0003 corresponds to "south"); and approximately matched with edit distance of 1 transposition (0002 and 0003 are transposed) 0001 0003 0002.

It should be noted that an n-gram is a sub-sequence of n items from a given sequence. n-grams are used in various areas of statistical natural language processing. An n-gram model models sequences, notably natural languages, using the statistical properties of n-grams. The idea is that given a sequence of letters (for example, the sequence "for ex"), what is the likelihood of the next letter? From training data, one can derive a probability distribution for the next letter given a history of size n: a=0.4, b=0.00001, c=0 . . . ; where the probabilities of all possible "next-letters" sums to 1.0. More concisely, an n-gram model predicts $x_i$ based on $x_{i-1}$, $x_{i-2}$, . . . $x_{i-n}$. In application to language modeling, because of computational limitations and the open nature of language (there are infinitely many possible words), independence assumptions are made so that each word depends only on the last n words, making it a good Markov model.

n-grams can be used for efficient approximate matching. By converting a sequence of items to a set of n-grams, it can be embedded in a vector space (in other words, represented as a histogram), thus allowing the sequence to be compared to other sequences in an efficient manner. For example, if we convert strings with only letters in the English alphabet into 3-grams, we get a $26^3$-dimensional space (the first dimension measures the number of occurrences of "aaa", the second "aab", and so forth for all possible combinations of three letters). Using this representation, we lose information about the string. For example, both the strings "abcba" and "bcbab" give rise to exactly the same 2-grams. However, we know empirically that if two strings of real text have a similar vector representation (as measured by cosine distance) then they are likely to be similar. Other metrics have also been applied to vectors of n-grams with varying, sometimes better, results. For example z-scores have been used to compare documents by examining how many standard deviations each n-gram differs from its mean occurrence in a large collection, or corpus, of documents (which form the "background" vector).

In 405, the suggestions of 404 are encoded back to the original form using the array data structure of 303 of phase 1. For instance:

0001 0003 0002->"upper south street", which is the expected result.

The present invention can be used to build a contracted dictionary of multi-word proper names with a small memory foot print from a list of multi-word names (that can contain millions of multi-word names) that can fit on devices with constrained resources. Effective approximate searching of a multi-word name is provided and suggestions that closely match the multi-word name looked for together with all information associated with it are returned. The present invention further provides efficient approximate searching of multi-word names making use of the structure of trie-based dictionaries.

Multi-word name identity resolution and detection.

A list of one million (1000000) of Arabic people names has been used to build a contracted dictionary in order to validate the present invention. The data set comprised 2189 unique single word names. Each full name consisted of 4 single word names. The raw source data was 103 Mb of UTF-16 text. The size of a contracted dictionary based on a conventional technique was 89 Mb. The size of a contracted dictionary built according to the present invention was only 25 Mb.

In an embodiment, the present invention can be executed by a service provider in a server. The server builds a contracted trie-based dictionary on request of a client providing on a list of names and sends back to the client a contracted dictionary according to the present invention. More particularly, the server: receives a list of multi-word units from a client; and sends back to the client a contracted dictionary based on the list of multi-word units.

In another embodiment, the server receives requests from one or a plurality of clients for searching for multi-word names in a contracted trie-based dictionary built according to the present invention and sends back to the clients the result of its searches. More particularly, the server: receives from one or a plurality of clients, one or a plurality of requests, each request comprising one or a plurality of multi-word units; and sends back to each client, in response to each request, one or a plurality of suggested multi-word units for each multi-word unit.

While the invention has been particularly shown and described with reference to a preferred embodiment, it will be understood that various changes in form and detail may be made therein without departing from the spirit, and scope of the invention.

What is claimed is:

1. A method for automatically building a contracted dictionary from a given list of multi-word units, comprising:
   receiving an input list of original multi-word units; and
   employing a computer device for:
   transforming each of the original multi-word units into single word elements;
   associating an identifier with each single word element to obtain a collection of unique identifiers, each identifier being associated with a single word element;
   storing the collection of identifiers and associated single word elements in a letter dictionary based on a trie, wherein:
   each entry is a single word element;
   letters of the single word elements are nodes of the trie; and
   identifiers are glosses attached to the terminal nodes of the trie;
   encoding each original multi-word unit in the input list by replacing each single word element within each multi-word unit by the associated identifier;
   storing the encoded multi-word units in an identifier trie-based dictionary, wherein each entry is a set of identifiers representing a multi-word unit and each node is an identifier; and
   building a contracted dictionary by contracting the letter trie-based dictionary and the identifier trie-based dictionary; the contracting comprising, for the letter trie-based dictionary and the identifier trie-based dictionary, merging trie nodes while preserving each entry of the letter trie-based dictionary and each entry of the identifier trie-based dictionary.

2. The method according to claim 1, wherein receiving an input list of original multi-word units further comprises:
   associating abstract information with each original multi-word unit.

3. The method according to claim 2, wherein storing the encoded multi-word units in an identifier trie-based dictionary further comprises:
   attaching to each terminal node, the abstract information associated with the multi-word unit.

4. The method according claim 2, wherein merging the trie nodes further comprises:
   merging trie nodes whenever the trie nodes have identical abstract information.

5. The method according claim 1, further comprising:
   storing in a database the association of unique identifiers with single word elements.

6. The method according to claim 1, wherein merging the trie nodes further comprises:
   merging trie nodes without introducing any additional entry; and
   merging trie nodes without losing existing entries.

7. The method according to claim 1, wherein the method is executed in a server; further comprising:
   receiving a list of multi-word units from a client; and
   sending back to the client a contracted dictionary.

8. A system for automatically building a contracted dictionary from a given list of multi-word units, comprising:
   a computer device, including:
   a system for receiving an input list of original multi-word units;
   a system for transforming the original multi-word units into single word elements;
   a system for associating an identifier with each single word element to obtain a collection of unique identifiers, each identifier being associated with a single word element;
   a system for storing the collection of identifiers and associated single word elements in a letter dictionary based on a trie, wherein:
   each entry is a single word element;
   letters of the single word elements are nodes of the trie; and
   identifiers are glosses attached to the terminal nodes of the trie;
   a system for encoding each original multi-word unit in the input list by replacing each single word element within each multi-word unit by the associated identifier;
   a system for storing the encoded multi-word units in an identifier trie-based dictionary, wherein each entry is a set of identifiers representing a multi-word unit and each node is an identifier; and
   a system for building a contracted dictionary by contracting the letter trie-based dictionary and the identifier trie-based dictionary, the system for building a contracted dictionary further comprising, for the letter trie-based dictionary and the identifier trie-based dictionary, a system for merging trie nodes while preserving each entry of the letter trie-based dictionary and each entry of the identifier trie-based dictionary.

9. A program product stored on a non-transitory computer readable medium, which when executed, automatically builds a contracted dictionary from a given list of multi-word units, the computer readable medium comprising program code for:
   receiving an input list of original multi-word units;
   transforming the original multi-word units into single word elements;
   associating an identifier with each single word element to obtain a collection of unique identifiers, each identifier being associated with a single word element;
   storing the collection of identifiers and associated single word elements in a letter dictionary based on a trie, wherein:
   each entry is a single word element;
   letters of the single word elements are nodes of the trie; and
   identifiers are glosses attached to the terminal nodes of the trie;
   encoding each original multi-word unit in the input list by replacing each single word element within each multi-word unit by the associated identifier;

storing the encoded multi-word units in an identifier trie-based dictionary, wherein each entry is a set of identifiers representing a multi-word unit and each node is an identifier; and building a contracted dictionary by contracting the letter trie-based dictionary and the identifier trie-based dictionary; the contracting comprising, for the letter trie-based dictionary and the identifier trie-based dictionary, merging trie nodes while preserving each entry of the letter trie-based dictionary and each entry of the identifier trie-based dictionary.

10. A method for performing fuzzy searches in a contracted dictionary of multi-word units, the contracted dictionary comprising two contracted trie-based dictionaries:

a letter trie-based dictionary comprising single word elements, each word element having an identifier, each identifier being associated with a single word element, wherein each entry is a single word element, letters of the single word elements are nodes of the trie, and identifiers are glosses attached to the terminal nodes of the trie; and an identifier trie-based dictionary comprising multi-word units encoded with the identifiers wherein each entry is a set of identifiers representing a multi-word unit and each node is an identifier;

wherein the contracting comprises, for the letter trie-based dictionary and the identifier trie-based dictionary, merging trie nodes while preserving each entry of the letter trie-based dictionary and each entry of the identifier trie-based dictionary;

the method further comprising:

employing a computer device for:

receiving a request comprising a multi-word unit;

transforming the multi-word unit into single word elements;

for each single word element, identifying in the letter trie-based dictionary a suggested word element with an identical string of letters and if none exists, applying on the letter trie-based dictionary an approximate matching technique for generating at least one suggested single word element with a letter string as similar as possible to the single word element;

for each suggested word element, extracting from the letter trie-based dictionary the suggested single word element encoded with an identifier, each identifier being associated with a single word element;

generating at least one multi-word unit candidate encoded with identifiers by assembling identifiers of encoded existing and suggested single word elements;

for each encoded multi-word unit candidate, applying on the identifier trie-based dictionary, an approximate matching technique for obtaining at least one suggested multi-word unit encoded with identifiers as similar as possible to the encoded multi-word unit candidate; and for each encoded suggested multi-word unit, replacing each identifier by the associated single word element.

11. The method according to claim 10, wherein applying on the letter trie-based dictionary an approximate matching technique for generating at least one suggested word element, further comprises:

rejecting and ranking suggested word elements using a proximity factor.

12. The method according to the claim 11, wherein the proximity factor is based on a phonetic proximity.

13. The method according to claim 11, wherein the proximity factor is based on an edit distance.

14. The method according to claim 10, wherein the approximate matching technique is based on an edit distance.

15. The method according claim 10, wherein the approximate matching technique is based on n-gram proximity.

16. The method according to claim 10, wherein the method is executed in a server, further comprising:

receiving from at least one client, at least one request, each request comprising at least one multi-word unit; and sending back to each client, in response to each request, at least one suggested multi-word unit for each multi-word unit.

* * * * *